March 6, 1934.  W. H. FULTON  1,949,934
PURIFIER
Filed April 14, 1930  2 Sheets-Sheet 1
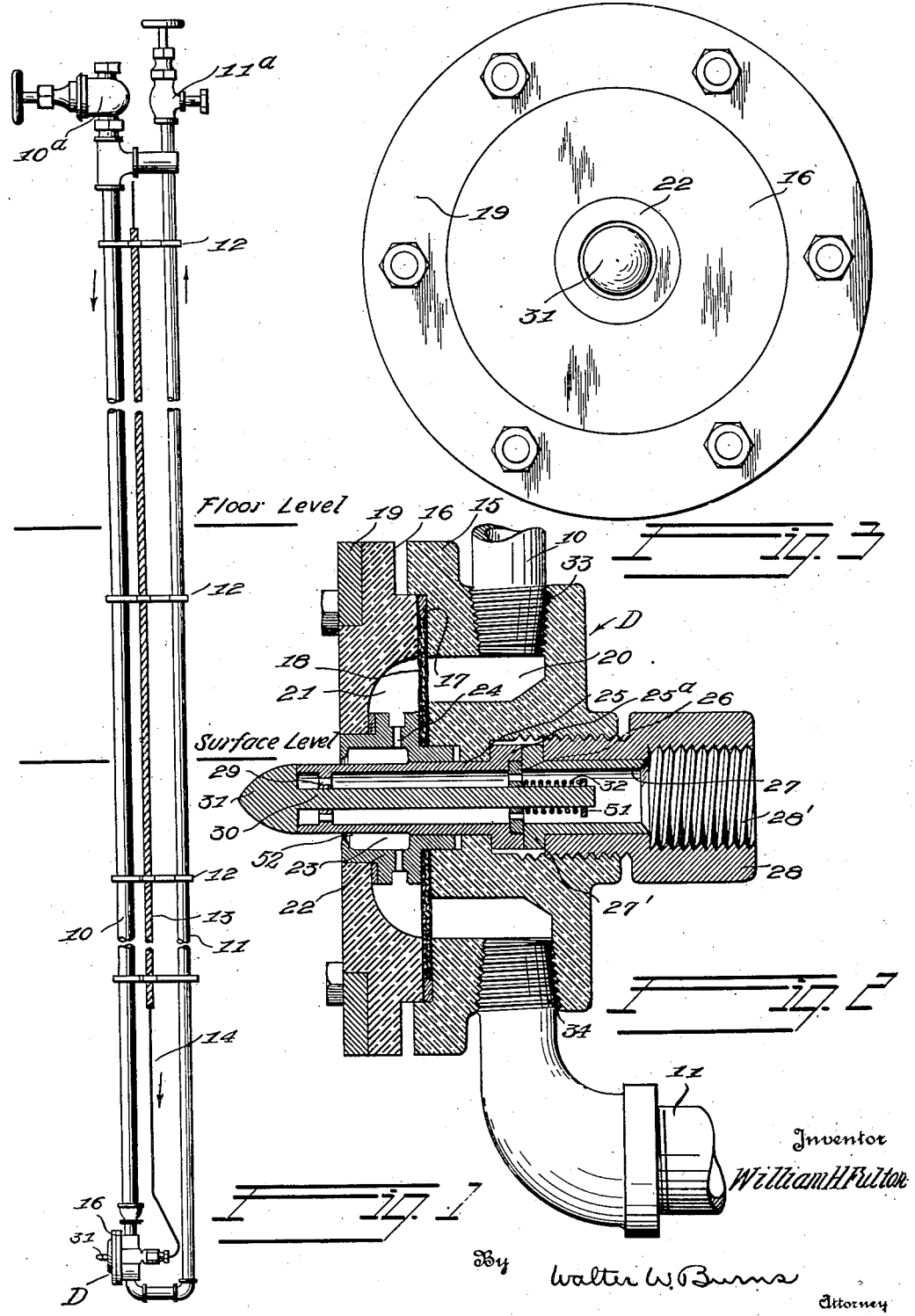
Inventor
William H Fulton
By Walter W Burns
Attorney March 6, 1934.    W. H. FULTON    1,949,934
PURIFIER
Filed April 14, 1930    2 Sheets-Sheet 2
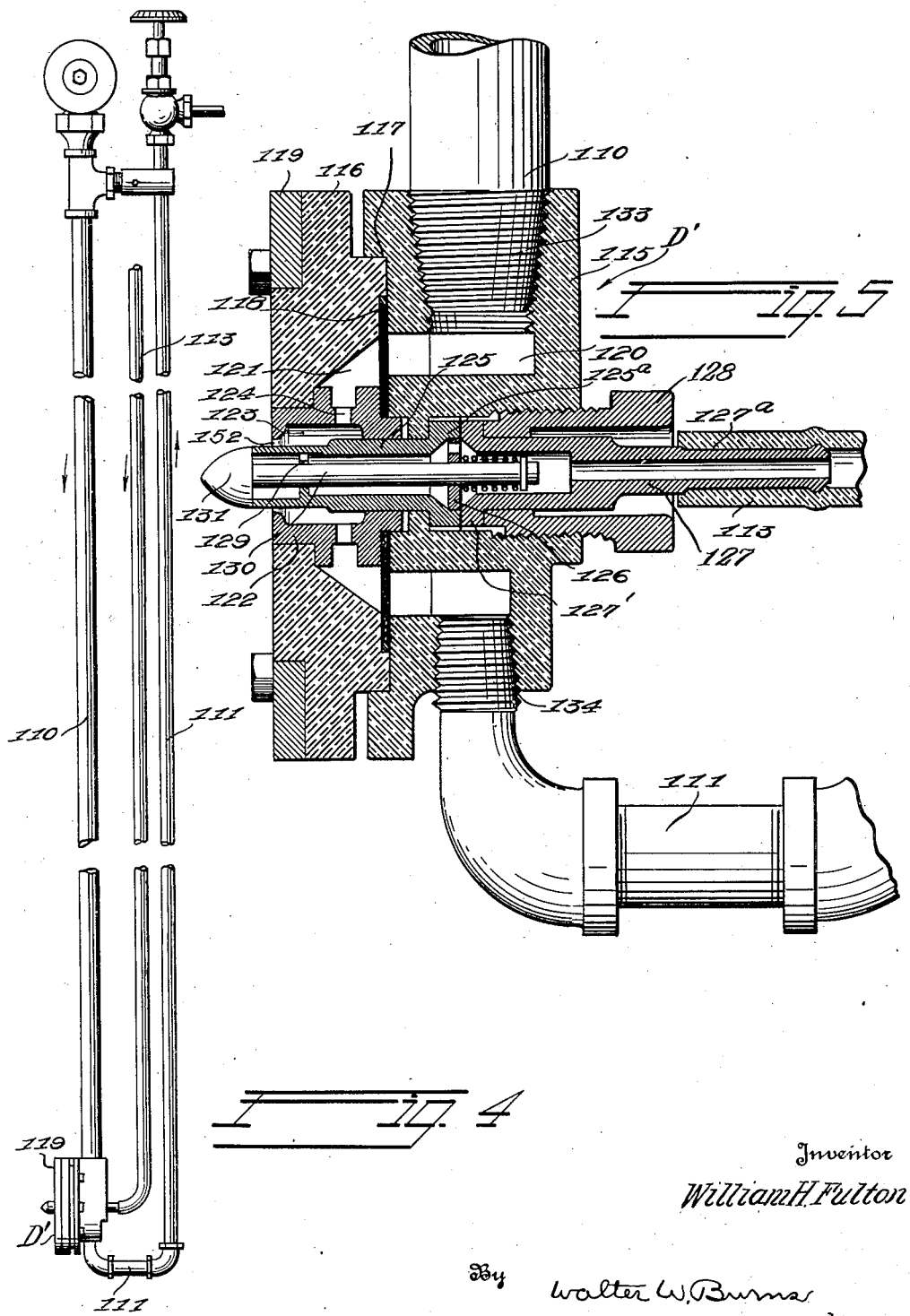
Inventor
William H. Fulton
By Walter W. Burns
Attorney Patented Mar. 6, 1934

1,949,934

UNITED STATES PATENT OFFICE

1,949,934
PURIFIER

William H. Fulton, Orange, N. J., assignor to The Paradon Company, Arlington, N. J., a corporation of Delaware Application April 14, 1930, Serial No. 444,649

15 Claims. (Cl. 210—28)

This invention relates to the treatment of liquids with gases. The invention has been made with the idea of providing an improved method and means for supplying a treating gas such as chlorine to a body of water, sewage or other liquid for the purpose of purifying, or sterilizing, the liquid, and the object of the invention is generally to effect the desired sterilization with the use of a minimum amount of the chlorine or other treating gas by introducing the treating gas directly as a gas into the liquid to be treated and distributing the gas in a finely divided condition rapidly through the liquid so as to secure the greatest possible surface contact between the gas and the liquid and very complete and widespread diffusion of the gas in the liquid.

In the treatment of water and sewage with chlorine, it is desirable to bring the chlorine into contact with all portions of the liquid to be treated as quickly as possible. The difficulty in attaining this result is greater in treating large bodies of liquid in containers or channels which are more or less open to the atmosphere than when the liquid is passing through a closed relatively small passage or conduit which is full of the liquid. The present invention is especially valuable by reason of the fact that it overcomes difficulties heretofore met with in the treatment of open bodies of liquid, but the invention is equally adapted to the treatment of liquid flowing through closed passages or conduits.

Two methods are in use for treating bodies of liquid with chlorine, the dry feed method and the solution feed method. In the solution feed method, the chlorine is first dissolved in a suitable quantity of water or other liquid, and this solution is then introduced into the liquid to be treated. This method involves the use of a considerable quantity of the auxiliary water, and involves some waste of the chlorine, especially when using screened sewage. In the dry feed method, the chlorine is introduced as a gas directly into the liquid to be treated. This method has the advantage of being most economical in the use of the chlorine, but, as heretofore practiced, it has been difficult, especially when treating liquid in open containers, to secure the desired diffusion of the gas in the liquid and to avoid escape of undissolved gas from the surface of the liquid, resulting in waste and the introduction into the atmosphere of an obnoxious element.

The present invention relates to the dry feed method of treating liquid with chlorine or other gases, and provides a method and apparatus whereby better diffusion of the gas in the liquid, and consequent more efficient use of the gas, is attained than has heretofore been found possible. The invention comprises a method wherein a stream of the treating gas is discharged into the liquid, and this gas stream is then disrupted and the gas deflected and driven in finely divided condition through the liquid by means of a stream of water or other suitable liquid or gas which is discharged into the liquid to be treated as a separate stream moving in a path which crosses the path of the issuing gas stream. Most desirably, the treating gas is discharged into the liquid in a thin film-like stream, and the disrupting stream of liquid or gas is also a thin stream discharged from a separate orifice, as in this way the desired distribution is obtained with a minimum amount of fluid used for the disrupting stream. The invention also comprises apparatus for carrying out the method.

By the method and apparatus of the invention, the chlorine or other treating gas is most effectually diffused in the water being treated. It is finely divided so that it presents a maximum surface to the water, and its buoyancy and tendency to rise through the water are reduced, thus increasing the time of contact of the diffused gas with the water. It is driven rapidly through the water, thus greatly increasing its distribution and the rapidity of diffusion and causing a more rapid absorption, and, at the same time, delaying its rise to the surface and thus further increasing the time of contact; and the water is violently agitated, producing a circulation which is of great advantage in securing the desired rapid distribution and accelerating absorption of the gas. The amount of water used for the gas disrupting and diffusing stream is much less than is required in introducing chlorine by the solution feed method.

The accompanying drawings illustrate a diffusing device and supply connections embodying the apparatus features of the invention and especially intended for use in treating water or sewage with chlorine in accordance with the new method, and a slightly modified form of the device.

In said drawings:—

Figure 1 is an elevation of a device embodying my invention and showing the connections for supply.

Figure 2 is a cross sectional view of one form of my invention.

Figure 3 is a front view of the device illustrated in Figures 1 and 2.

Figures 4 and 5 are views corresponding to Figures 1 and 2, but of a slightly different form.

Similar reference characters refer to the same or similar parts throughout the views of the drawings.

Referring to Figures 1, 2 and 3, 10 designates a water supply pipe and 11 a wash-out or flushing pipe. These two pipes as shown are connected together by clamps 12 which hold the pipes in spaced relation. The clamps 12 are provided with openings intermediate their ends to receive a flexible tubing 13 which serves as a protector for a tube 14 which, in the present instance, is of silver and is for the purpose of conducting chlorine gas to the diffusing device D to which the pipes 10 and 11 are also connected.

In order to give the purifying agent, as chlorine gas, a maximum surface while in contact with the body to be purified and to keep it in contact with the body until it has been absorbed, I have provided a means for driving the purifying agent into the body to be purified, in small particles. In the embodiment illustrated, it is contemplated to force a dry gas such as chlorine out into a body to be purified, such as water or sewage and to have a means as a water orifice adjacent the outlet of the chlorine to drive it into the body to be purified in a way to cause the diffusion of the small bubbles throughout the body and to move them rapidly through the mass to cause a more rapid rate of absorption.

Referring particularly to Figure 2, 15 designates the body of the diffuser D which is located at the delivery end of the conduit which carries the purifying agent. A cover plate 16 has a portion which fits into a recess 17 in the face of the body 15 and holds therebetween a fine mesh screen 18. The parts 15 and 16 are of any suitable material such as hard rubber and are held together in any suitable manner as by a steel ring 19, which is bolted or screwed to the body member 15 in a well known manner.

The body member 15 has an annular chamber 20 which registers with a corresponding chamber 21 on the opposite side of the screen 18 in the cover plate 16. The screen 18 is in the shape of a ring and in addition to the bearing in the recess 17, it has a bearing on the body member 15 inwardly of the annular chamber 20.

A member 22 is made of corrosion resisting metal, as silver, and is of a size and shape to form the inner wall of the chamber 21 and to be clamped between the cover 16 and the screen 18. Within the member 22 is a chamber 23 and connecting this chamber 23 with the chamber 21 are openings 24.

Extending from the member 22 and having a bearing therein is a member 25 which is made of corrosion resisting metal, as silver, and which is hollow.

This member 25 has an enlarged inner end 25ª which engages a coacting shoulder of the body member 15 and is pressed against the shoulder by a bearing ring 26. This bearing ring is perforated to permit the passage of fluid and is held in place by a sleeve 27 which in turn is held in place by a plug coupling 28 which bears against a flange 27' on the sleeve 27. This plug coupling 28 is threaded into the body member 15 and by means of its threads holds the parts 15, 25, 26, 27 and 28 together.

The outer end of the member 25 is provided with an interior bearing flange 29 which is provided with a series of openings to permit fluid passage as will be presently described.

In the bearing flange 29 and the bearing ring 26, is slidably mounted a stem 30 of a valve means 31. On the inner end of the stem 30 is a ring 51 for retaining in place a spring 32 which normally maintains the stem 30 in retracted position.

The outer end of the member 25 is preferably a plane surface and the coacting surface of the valve means 31 is similarly shaped. When a pipe or other conduit means 14 is connected to the threaded end 28' of the plug connector 28, the chlorine or other treating gas may pass through the openings in the sleeve 27, the bearing member 26, the interior of the member 25, the openings in the flange 29 and out to press against the valve means 31. When the pressure in the passages is sufficient, the valve means 31 will move outwardly and the gas will be forced outwardly into the medium outside of the device. These two coacting faces of the members 25 and 31 form an orifice to deliver the treating gas.

The member 22 adjacent the outer edge of the chamber 23, is spaced from the surface of the member 25 to form an annular orifice 52. The pipes 10 and 11 are threadedly connected to the threaded openings 33, 34, respectively.

In the operation of the device, the treating gas is supplied through the pipe 14. This pipe and the members 27, 26, 28, 30, 31, 22 and 25 being of a corrosion resisting material, no reaction from the purifying agent will take place. The gas, as chlorine, in the operation here described, is forced in the dry state through the openings in the members 25, 26, 29 and presses against the movable valve means 31. When the pressure reaches a predetermined amount, as controlled by the spring 32, the valve means will open and the treating gas will pass into the liquid to be purified. It will be noted that with the contacting walls of the members 31 and 25 shaped as illustrated, the gas will be thrown off radially in all directions. If chlorine is used this gas is forced out in its dry state in a thin film from between the coacting walls of the members 25 and 31. As the gas is set free its tendency is to break up into small bubbles, due to the fact that its field of operation widens as the gas moves radially.

In addition to this spreading of the purifying fluid due to the radial travel from the orifice, I have provided for assisting this spreading and breaking operation. The orifice 52 is located in a position for the delivery of a diffusing fluid, as a stream of water, in a direction to diffuse the treating gas in the liquid to be purified.

In the embodiment just described, the water passes downwardly through the pipe 10, into the chamber 20, through the screen 18, into the chamber 21, through the openings 24, into the chamber 23 and out of the orifice 52. This stream encounters the treating gas as it leaves its orifice and causes the treating gas to be broken up into small bubbles and it also sets up a current within the liquid to be purified, thereby spreading the treating gas throughout a large volume of the liquid to be purified. This has the further action of moving the treating gas through the liquid to be purified with a consequent changing of the portions of the liquid with which the gas is in contact.

Summarizing, some of the outstanding advantages of this construction are:

1. To finely divide the treating gas, thus presenting a maximum surface to the body to be purified, for a given amount of gas and a minimum of buoyancy to the gas in the liquid.

2. To forcibly break up the film of treated gas as it emerges from the orifice and further break it up into smaller bubbles.

3. To place the treating gas in contact with different parts of the liquid to be purified and thereby bring about a more uniform absorption.

4. To move the treating gas quickly through the liquid to be purified, thus causing a more rapid absorption of the treating gas by giving it moving contact with a larger amount of the liquid to be purified.

The screen 18 being of a fine mesh prevents the entrance of foreign substances to the chamber 23 which feeds the orifice 52. During normal operation of the device, the valve 10ª is open and the valve 11ª is closed. When it is desired to flush the chamber 20, the valve 11ª is opened. This permits the water from the pipe 10 to freely pass through the chamber 20 and out at the lower end to and through the wash-out pipe 11, the valve 11ª to a lead off. This action cleans the surface of the mesh 18 of any collected foreign matter.

In Figures 4 and 5 is illustrated a modified form of the invention. The supply and wash-out pipes 110 and 111 correspond to the pipes 10 and 11 already described.

These two pipes are held in spaced relation by their connection together by the fittings and the diffuser at the bottom as in Fig. 1.

A rubber tube 113 connects the source of supply of treating gas with the diffuser D' to be described.

In the form illustrated in Figures 4 and 5, the parts 115, 116, 117, 118, 119, 120, 121, 122, 123, 124, 125, 125ª and 126, correspond to the similarly shaped parts 15, 16, 17, 18, 19, 20, 21, 22, 23, 24, 25, 25ª and 26, respectively. The part 127 corresponds to the part 27 already described and has an enlarged portion 127', but at its opposite end is provided with a nipple 127ª which is connected to the hose 113 already described. The part 128 is suitably threaded in the member 115 and because of the enlarged portions 125ª and 127', these parts are held rigid with the part 115.

The parts 129, 130, 131, 152, 133 and 134 all correspond respectively to the correspondingly shaped parts 29, 30, 31, 52, 33, and 34, already described.

The materials used in this structure are similar to the materials used in the structure illustrated in Figures 1, 2 and 3, those parts which are exposed to the treating gas being of a corrosion resisting metal construction, the part 116 being of hard rubber.

The operation of the two devices is similar except that with the rubber hose, conduit 113, the tube 14 is dispensed with, thus making it unnecessary to carefully protect the tube 14.

While I have shown and described, in detail, embodiments of my invention, I desire to have it understood that these are merely illustrative and that modifications and changes in the construction and operation may be made without departing from the spirit of the invention and within the scope of the appended claims.

Having described my invention what I claim and desire to secure by Letters Patent is:—

1. The method of supplying a treating gas to a body of liquid to be treated, which comprises discharging a stream of the gas into the liquid, and discharging into the liquid from a separate orifice a stream of fluid moving in a path which crosses the path of the issuing gas stream, whereby the gas stream is disrupted and the gas is deflected and driven in finely divided condition through the liquid.

2. The method of supplying a treating gas to a body of liquid to be treated, which comprises forcibly discharging a thin film-like stream of the gas into the liquid, and forcibly discharging into the liquid from a separate orifice a thin stream of fluid moving in a path which crosses the path of the issuing gas stream, whereby the gas stream is disrupted and the gas is deflected and driven in finely divided condition through the liquid.

3. The method of treating a liquid with chlorine, which comprises discharging a stream of chlorine gas into the liquid, and discharging into the liquid from a separate orifice a stream of liquid moving at high velocity in a path which crosses the path of the issuing gas stream, whereby the gas stream is disrupted and the gas is deflected and driven in finely divided condition through the liquid being treated.

4. The process of introducing a gaseous purifying agent into a body to be purified which consists in forcing the gas, under artificial pressure, to a restricted orifice beneath the surface of the body to be purified, releasing it in a thin film-like stream within the body to be purified and then, by hydraulic force, driving it away from the place of release.

5. The process of applying a sterilizing gas to a liquid which consists of delivering the gas into the body of the liquid at a pressure sufficiently greater than that due to the hydraulic head of the liquid to cause an immediate expansion and rupture of the mass of gas as delivered into a myriad of minute masses of gas and then diverting the movement of these small masses from their normal movement toward the surface of the liquid.

6. Apparatus for supplying a treating gas to a body of liquid to be treated, which comprises means for discharging a stream of gas into the liquid, and means for discharging into the liquid a separate high velocity stream of fluid moving in a path which crosses the path of the gas stream close to its place of discharge, whereby the gas stream is disrupted and the gas is deflected and driven in a finely divided condition through the liquid.

7. Apparatus for supplying a treating gas to a body of liquid to be treated, which comprises means providing a discharge orifice submerged in the liquid, means for supplying the treating gas under pressure to said orifice to cause a stream of the gas to be discharged from the orifice into the liquid, means providing a second discharge orifice, and means for supplying a fluid under pressure to said second orifice to cause a high velocity stream of fluid to be discharged from the second said orifice into the liquid, the second said orifice being formed and set to direct the stream of fluid discharged therefrom across the path of the stream of gas issuing from the first said orifice, whereby the gas stream is disrupted and the gas is deflected and driven in finely divided condition through the liquid.

8. A diffusing device for supplying a treating gas to a body of liquid to be treated adapted to be submerged in the liquid, which comprises a gas conduit, a valve head mounted to seat against the end of said conduit and movable away from its seat against spring tension, a connection to said conduit for supply of gas under pressure sufficient to force the valve head away from its seat to permit the gas to escape into the liquid through the orifice between the valve head and its seat, and means for discharging into the liquid a separate high velocity stream of fluid moving in a path which crosses the path of the gas stream issuing from the conduit.

9. A diffusing device for supplying a treating gas to a body of liquid to be treated, comprising a gas discharge tube, a valve head having a stem mounted within the tube and adapted to close against the end of the tube, a spring tending to hold the valve head against the end of the tube, a connection for supply of the treating gas under pressure to said tube, a chamber surrounding said tube, a connection for supply of fluid under pressure to said chamber, the outer wall of said chamber having an opening through which the tube extends, the edge of said opening being spaced from said tube to provide a narrow annular discharge orifice spaced inward from the discharge end of the tube through which fluid is discharged from said chamber in a high velocity stream surrounding the tube and moving across the path of the gas stream issuing from the orifice between the end of the tube and said valve head.

10. A diffusing device for supplying a treating gas to a body of liquid to be treated, comprising means providing a gas nozzle having a circumferentially extending discharge orifice opening peripherally of the nozzle to discharge the gas in a thin outwardly directed stream, and means providing a fluid discharge orifice spaced back from the gas orifice and extending about the nozzle concentric with the gas orifice for discharging a stream of fluid moving longitudinally of the nozzle axis to strike the issuing gas stream.

11. A diffusing device for supplying a treating gas to a body of liquid to be treated, comprising a gas nozzle tube having an annular discharge orifice opening peripherally of the tube to discharge the gas in a thin outwardly directed stream, and means providing an annular fluid discharge orifice around and close to the gas nozzle tube for discharging a high velocity stream of fluid longitudinally of the nozzle tube to strike the issuing gas stream.

12. A diffusing device for supplying a treating gas to a body of liquid to be treated, comprising means for discharging a stream of gas into the liquid, a fluid chamber having an inlet for fluid under pressure and a normally closed outlet, a second chamber, a screen separating said chambers, means providing a discharge orifice connected with the second said chamber for discharging a high velocity stream of fluid across the path of the issuing gas stream, and means for opening the outlet of the first said chamber to establish a flow of the fluid through the chamber to clear the screen.

13. A liquid-purifying apparatus comprising a conduit for discharging a dry gas purifying agent into the body of the liquid to be purified, the conduit being provided with an orifice at its discharge end, the orifice being relatively long and narrow so as to deliver a film-shaped stream of gas and means adjacent the delivery of the gas stream to cause the gas to be broken up into small bubbles and for diffusing the gas in the liquid body.

14. A liquid-purifying apparatus comprising a conduit for discharging a dry gas purifying agent into the body of the liquid to be purified, the conduit being provided with an orifice at its delivery end, the orifice being relatively long and narrow so as to deliver a film-shaped stream of gas to the liquid to be purified and a second orifice adjacent the gas orifice for the delivery of a fluid against the gas stream to cause the gas to be broken up into small bubbles and for causing it to be diffused in the liquid to be purified.

15. A liquid-purifying apparatus comprising a conduit for discharging a dry gas purifying agent into the body of the liquid to be purified, the conduit being provided with an orifice at its delivery end, the orifice being relatively long and narrow so as to deliver a flat film-shaped stream of gas about its periphery and a second orifice adjacent the gas orifice for the delivery of a fluid across the path of the gas to cause the gas to be broken up into small bubbles and be carried away from the gas orifice and diffused in the liquid to be purified.

WILLIAM H. FULTON.